Sept. 15, 1925.
H. JUNKERS
FLYING MACHINE COVERING
Filed June 26, 1920    4 Sheets-Sheet 1
1,553,695
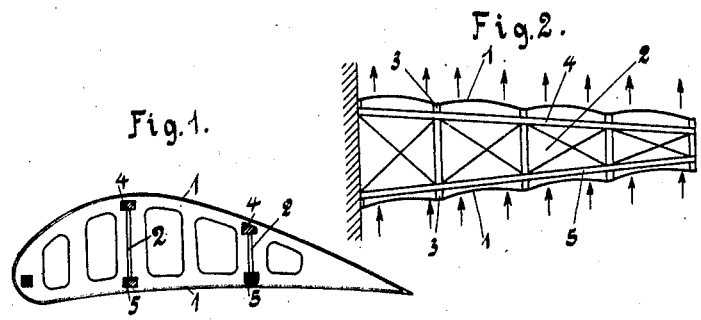
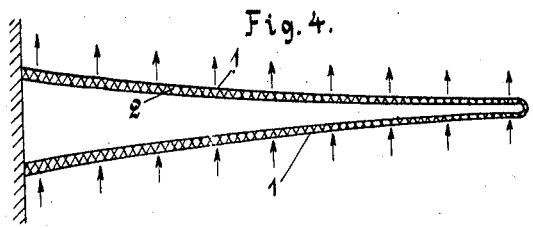
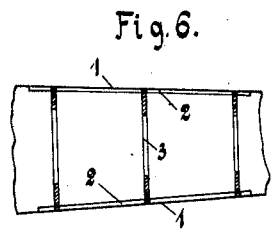
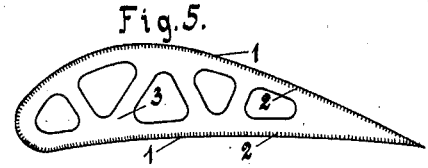
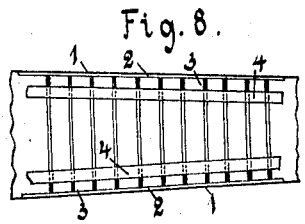
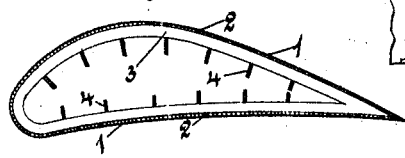
Inventor:
Hugo Junkers Sept. 15, 1925. 1,553,695
H. JUNKERS
FLYING MACHINE COVERING
Filed June 26, 1920 4 Sheets-Sheet 2
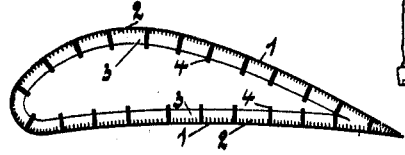
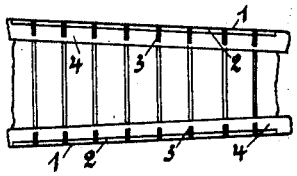
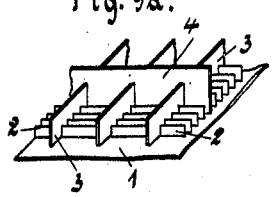
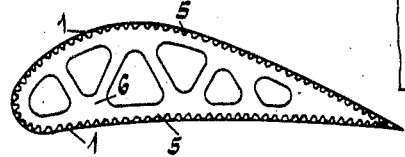
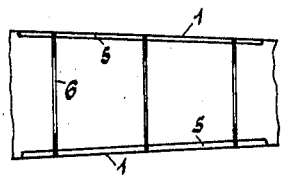
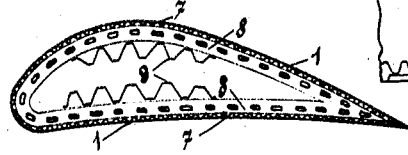
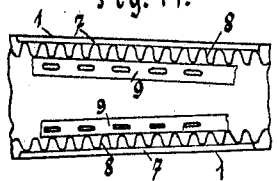
Inventor:
Hugo Junkers Sept. 15, 1925.  
H. JUNKERS  
FLYING MACHINE COVERING  
Filed June 26, 1920       4 Sheets-Sheet 3
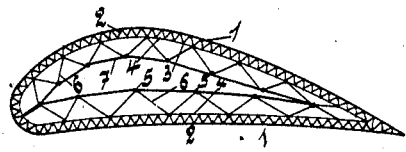
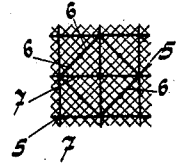
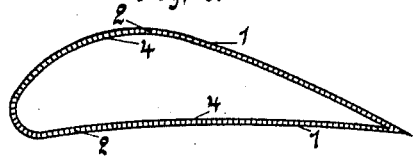
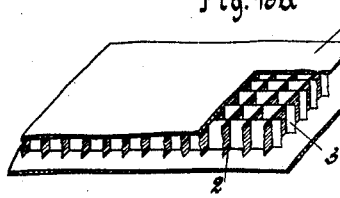
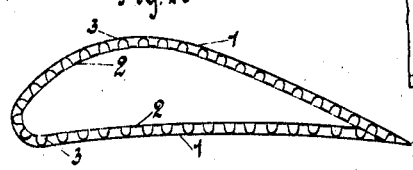
Inventor:  
Hugo Junkers Sept. 15, 1925.

H. JUNKERS

FLYING MACHINE COVERING

Filed June 26, 1920    4 Sheets-Sheet 4

Inventor:

Hugo Junkers

Patented Sept. 15, 1925.

1,553,695

UNITED STATES PATENT OFFICE.

HUGO JUNKERS, OF AACHEN-FRANKENBURG, GERMANY.

FLYING-MACHINE COVERING.

Application filed June 26, 1920. Serial No. 392,142.

(GRANTED UNDER THE PROVISIONS OF THE ACT OF MARCH 3, 1921, 41 STAT. L., 1313.)

*To all whom it may concern:*

Be it known that I, HUGO JUNKERS, a citizen of Germany, residing at Aachen-Frankenburg, Germany, have invented certain new and useful Improvements in Flying-Machine Coverings (for which I have filed applications in Germany, August 6, 1915; Holland, June 6, 1919), of which the following is a specification.

My invention refers to flying machines and more especially to a novel kind of covering for the supporting surfaces, hulls or shells, rudders, floats, and the like, appertaining thereto, in other words, for hollow bodies of light weight such as are required in the construction of flying machines and which are loaded in a perpendicular direction relatively to their surface by wind pressure forces (forces of aspiration and compression).

In the case of the customary kind of covering made of a woven fabric which, to prevent any inadmissible formation of folds, or the like, must in and for themselves be stretched very tight, the air pressure acting perpendicularly on the covering will create exceptionally high strains, since the covering is only enabled to transmit tensile forces, and its shape is to undergo in connection therewith but the very slightest deformation possible.

Further coverings of the said type are in particular but very little proof against local strains, say such as are caused by shocks, or the like.

Now it has been found that merely substituting a covering of thin sheet metal for the cloth covering, will not obviate these drawbacks for the reason that thin sheet metal, even as cloth, when employed across a big surface area will also only be able to transmit tensile forces. It thus follows that the capacity of the material (i. e. the metal) of transmitting also compressional forces is not utilized in this case.

According to the present invention it is for that reason proposed to employ as a covering for the supporting and other surfaces of flying machines not simple thin sheet metal, but non-flexible plates which are enabled to immediately take up the air pressure forces coming to act on them, without being subjected to any notable deformation and this even for a greater surface area where the points of support are at a considerable distance from each other. These non-flexible plates are constructed in that special stiffening elements are arranged at short distances the one from the other on thin sheet metal or on thin disks of a material of any kind whatsoever, preferably of sheet metal character, and in any case possessing great compression strength. A construction of this kind will be able, after the manner of a non-flexible girder, to transmit the forces of the air pressure acting on a covering of the said kind and, under normal conditions, directed perpendicularly toward the surface, to the junction points for the said discs or plates. The invention may be practically carried out in the most diverse manner, and several forms of execution will be dealt with hereinafter with special reference to the drawings affixed to this specification and forming part thereof.

On employing an improved covering of this kind, it is no longer necessary to stretch the cover tightly for the purpose of obtaining the true shaping thereof. It thus follows that the material for the cover is subjected to far less stress, and in a like manner the frames, or the like, across which the covering is stretched, will not be loaded with any strains caused by stiffening action. Owing to the stays for the thin outer skin being arranged in close succession, the latter is rendered particularly capable of resisting any strains which come to act upon proportionately small areas, such as will occur when the surface is exposed to being pierced or broken by being trod on. Any notable deformation of shape owing to the action of the air pressure forces arising during flight, as also a gradual loosening or slackening of the covering such as would seriously impair a good flight action, are entirely out of question in the case of this improved construction.

The aforementioned way of constructing the covering in the manner of a plate capable of offering great resistance yields the additional possibility of not only transferring tensile forces, but also compressive forces and breaking stresses, in the direction of the plate surface. The stiffened outer skin is for this reason not only adapted to constitute a valuable substitute for customary cloth covering but besides those particular functions may be transferred to it which up to the present were relegated to the frame structures forming part of the supporting surfaces, and the like, namely to take up and transmit the bending and twisting forces arising in the wings, etc. This fact is of particular importance in connection with the construction of so-called self-supporting wings which are not provided with any external stiffening means.

Self-supporting wings of this kind have hitherto been constructed by a wing covering, made as a rule of some woven fabric, being fixed across a framework disposed within the interior of the wing, and which was arranged to take up the entire bending forces. A construction of this kind, it is true, involves the advantage of injurious resistances, such as the unprotected stay wires are apt to cause, being done away with, and of the entire supporting structure being better protected. However, it also involves the drawback of being difficult to construct and of having great weight, since the buoyancy and resistance forces acting on the covering have to be transmitted in an extremely circuitous manner requiring the provision of correspondingly strong supporting structures.

In order to obtain a hollow body of the least possible weight it is necessary to utilize as far as expedient the building material employed for the purpose of taking up and transmitting the forces arising in said hollow body. This again makes it necessary that the said material be disposed as much as possible along the outer faces of the hollow body, in order to render the moment of resistance of said body as large as possible. This requirement will be most satisfactorily complied with if the outer skin itself be made available for the purpose of transmitting the bending strains. This may be done in accordance with my invention by constructing the hollow body of plates stayed or stiffened in the manner hereinbefore set forth and constituting the main feature of my invention.

It will be found that hollow structures of this improved type do not merely embody the aforementioned advantages, which the novel form of covering affords on its own account, but beyond this they are particularly proof against local injuries. For while, in the case of the hitherto known forms of supporting surface constructions, the snapping of a stay wire, or the splitting of a longitudinal beam, say in consequence of injury by shot, will as a rule cause the destruction of the supporting surface, and therewith the sudden fall of the flying machine, the use of stiffened plates for the purpose of transmitting strains or forces— which is now effected by a very large number of individual members distributed all over the entire hollow structure—affords the possibility that, on one of these said members being injured, the adjacently located members will be enabled to assume and carry out its functions without their own capacity being in any way impaired or overstrained. It follows as a consequence, that local injuries of the supporting surface such as might result from gun shots, or the like, will affect the stability of the entire structure but to an insignificant measure, so that by these means there is an extraordinarily far reaching security, obtained against the wreckage of the flying machine owing to its supporting surface being injured by shot.

With the view to rendering the subject matter of my invention more explicit, several forms of execution are shown in the accompanying drawings, illustrating in particular the manner of employing the stiffened outer skin for the construction of self-supporting planes and hulls. In the drawings Fig. 1 is a diagrammatic cross-section and Fig. 2 a similar longitudinal section of an old form of construction of a self-supporting hollow body (supporting surface).

Figs. 3 and 4 are like views of a supporting surface for flying machines in accordance with the present invention.

Figs. 5 to 23 are enlarged cross sections and longitudinal sections, respectively, of supporting surfaces, with the exception of Figs. 9ª, 19ª and 20ª which are perspective views of details of the stiffening structure and Fig. 17 which is a plan view of the stiffening structure according to Figs. 15 and 16.

Figs. 24 and 25 are a cross section and partial longitudinal section, respectively, of the hull of a flying machine, while

Figure 22:
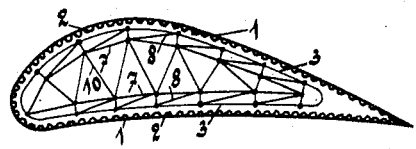

In the form of construction illustrated in Figs. 1 and 2, the supporting surface consists of a frame work 2 composed as a rule of rods or tubes, across the under and upper side of which a covering 1, usually of fabric, is stretched. The wind pressure forces acting on the covering, and indicated by small arrows in Fig. 2, are transmitted to the junction points 3 of the covering, and thence to the main girders 4, 5. These latter must be so strong as to enable them to reliably withstand breaking stresses arising within the single sections or fields of the frame work. These breaking stresses are considerably increased by the additional big strains acting on the outer skin.

In the form of wing shown in Figs. 3 and 4, and which is constructed in accordance with the present invention, the wind pressure forces, indicated by small arrows, again come to act on the outer skin 1. This outer skin is stiffened to such an extent by a reinforcement 2 (shown only diagrammatically in the drawing) attached to the inner face thereof, as to enable said outer skin to take up the wind pressure forces without undergoing any notable deformation, as also the bending strains formed in the wing itself. These bending strains will naturally be taken up chiefly by the main sections disposed at the greatest distance from the neutral section, say, along sections $a$ (Fig. 3). The surface portions $b$ disposed at the front, respectively, at the rear relatively to the direction of flight may be utilized to advantage for the purpose of taking up the shearing forces, so that no special rods or bars are required as in the case of the construction according to Fig. 1.

Figs. 5 and 6 illustrate the simplest way of staying the outer skin of a supporting surface. On the skin 1 there are mounted at a short distance from each other ribs 2, disposed in the direction of the maximum tensile and compressive stress for the purpose of simultaneously assisting the outer skin in taking up these forces. Transverse wall members (frames) 3 serve in the case of this construction as transverse reinforcements which, in order to obtain a saving in weight, are perforated and arranged at such a distance the one from the other that always between two such wall members the skin conjointly with its reinforcement will be adequately proof against breaking stress.

In the modifications shown in Figs. 7 and 8, the outer skin 1 is again stiffened by means of adjacently arranged ribs 2 disposed in the direction of the main stress. With the view to taking up transverse forces there are provided transverse ribs 3 which are supported by ribs 2, and the size and number of which depends upon the extent of this said transverse force. On the said transverse ribs 3 there are now arranged ribs 4, again disposed in the direction of ribs 2, and which are enabled to simultaneously assist the skin and ribs 2 in taking up the longitudinal forces.

Figs. 9 and 10 illustrate a construction similar to that shown by Figs. 7 and 8, with this difference that ribs 2, 3, and 4 are to a certain extent telescoped, so that they are all in contact with the skin edge. The ribs must traverse each other in such wise that the transmission of forces may take place within them without the least impediment. One advantage of this arrangement over and above that according to Figs. 7 and 8, is that the height of the structure may be considerably lessened, and the distribution of the longitudinal forces all over skin 1 and rib members 2 and 4 be effected with far greater reliability. Besides, there is obtained a saving in material since, the moment of resistance being the same, ribs 3 and 4 may be made less stout than in the previous case. The supporting plane will thus become correspondingly lighter in weight.

Fig. 9ª shows a section of skin 1 with the stiffening means in a perspective view.

In the case of the construction according to Figs. 11 and 12, skin 1 is reinforced by the superposition of a sheet of corrugated metal 5, the corrugations of which are likewise disposed in the direction of the maximum strain. Frame members 6 serve as transverse stays. This form of construction may be more easily carried into effect than that requiring the superposition of single rib members.

In the modification illustrated in Figs. 13 and 14, skin 1 is reinforced by means of corrugated sheet metal 7 comprising corrugations of trapezoidal section, while a second sheet of corrugated metal 8, with its corrugations disposed at right angles thereto, and the webs of which may be perforated to obtain a saving in weight, serves as a transverse stiffening means. According to requirement, there may be arranged additional rib members or plates of corrugated sheet metal 9 or the like, preferably intercrossed.

In the structure shown in Fig. 13 the plate of corrugated sheet metal 9 is solely disposed at points at a considerable distance from the neutral section to enable the material in this case to be well utilized for taking up the bending strains.

Instead of staying or stiffening the skin by means of ribs, it will be readily understood that also other reinforcing means of any kind whatsoever may be employed. Thus the reinforcement may be effected by means of frame work structures composed of rods or bars. According to Figs. 15 and 16, there are arranged in contact with the skin 1, and this at short intervals, rods or bars 2 which suitably converge at point 3 to form the angles of triangular or square pyramids. These points of junction are again interconnected by means of rods or bars 4, which latter may also be replaced by a piece of sheet metal that, for its part, may be perforated to obtain a saving in weight. The said piece of sheet metal is suitably rendered capable of resisting to an increased degree breaking stresses by being beaded, flanged, or similarly reinforced. By interposing additional props between point 5 and skin 1, say, perpendicularly to this latter, the subdivision of the reinforcing means for skin 1 may be still further improved. The invention is not restricted to the use of a single system of lattice girders; on the contrary upon the first, finely subdivided row, there may be placed a second, a third, and so forth, each of which is arranged to suitably reinforce or stiffen a larger area than the one immediately preceding it. In the case of the example illustrated, there is joined to the first frame work system a second for the purpose of forming an additional reinforcement, the diagonal rods 6 of this second system again constituting the angles of a pyramid and reposing, at greater intervals, on the junction points 3 of the first system. The junction points 5 for their part are again interconnected by means of bars or rods 7 or else by reinforced plates of sheet metal.

Fig. 17 shows a view of the superposed systems, the first being indicated by thin, the second by heavy lines.

The lattice work arrangement may be carried through until the upper and lower faces of the supporting plane have been completely interconnected by means of these lattice girders. In many cases it will prove sufficient if the succeeding frame work systems be constructed as level frame work structures, and disposing them in the direction whence the main strains come to enable them to assist the skin in taking up these said forces.

According to the material selected and the thickness of the skin it may in certain circumstances prove necessary to arrange the stiffening members at but a very slight distance (a few millimeters) from one another. In such cases, the arrangement of a reinforcement by means of rods or bars renders the construction too difficult. In such an event it will be found expedient to replace a frame work of rods or bars by plates of sheet metal. Thus, the structure shown in Figs. 15 and 16, will be replaced by a form of execution in the case of which there are arranged on the skin triangular, or, it may be, square pyramids of thin sheet metal, or the like, the apices of which are interconnected by means of bars, or else by a plate of sheet metal which may be perforated, or specially reinforced, in a manner similar to that above set forth.

By substituting intercrossed flat frame work structures by non-perforate structures, there will be obtained an arrangement such as is illustrated in Figs. 18 and 19, the skin in this particular case being stiffened by wall members 2, 3 crossing each other at right angles. A similar method of reinforcement may also be obtained by arranging side by side series of square or rectangular cells. In a like manner, reinforcements may be produced by arranging side by side series of triangular or hexagonal hollow bodies. In this case it will be found expedient in order to prevent the walls of the cells from bulging out, to close the said cells on the inner side of the supporting plane by means of a superposed cover plate 4.

In Fig. 18ª this arrangement is shown on an enlarged scale in a perspectve view.

In the modification illustrated in Figs. 20 and 21 the skin 1 is stiffened by means of a piece of sheet metal 2, provided with raised portions 3 stamped on. The summits of said raised portions are fixed to skin 1.

Fig. 20ª shows this embossed plate in a perspective view. The embossed sheet metal may also be fixed directly with its flat side to the skin 1, and there may be provided at the projecting raised portions of the embossed sheet metal a special reinforcing sheet metal member (similar to member 4 shown in Figs. 15 and 16). Between the skin and the reinforced sheet metal member there may be arranged by way of reinforcement a piece of sheet metal alternately embossed on both sides. The embossed portions, which are directed toward the one side, are thereupon rigidly fastened to the skin, those tending toward the opposite side to the stay plate.

As will be obvious, these reinforcements are not restricted to the forms of execution shown in the drawings, but also numerous other methods of execution are possible.

Figure 23:
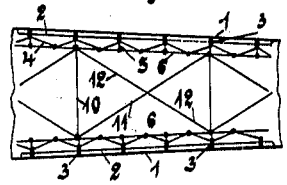

The various manners of reinforcement may be combined among each other. An example of this kind is illustrated in Figs. 22 and 23. According to this arrangement, the first longitudinal reinforcement of skin 1 consists of corrugated sheet metal 2, the first transverse reinforcement being effected by means of frames 3, for the purpose of a second longitudinal reinforcement there is then employed a frame work structure 4, 5, 6, 7, 8, the flanges 6, of which are so inclined as to enable them to likewise take up immedately longitudinal and transverse strains. Additional frame work members 10, 11, 12 are provided to stiffen the top and bottom faces of the supporting plane relatively to each other.

Besides this, a different system of reinforcement may be selected for the one direction than for the other. Thus, for example, the longitudinal stiffening means may consist of ribs, and the transverse stiffening means of frame work members. In a like manner, the cells or the embossed sheet metal plates may for their part be additionally propped by ribs or frame work members.

Figure 25:
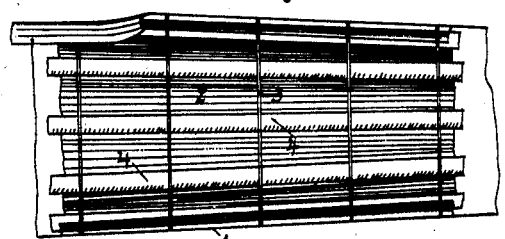
Figure 24:
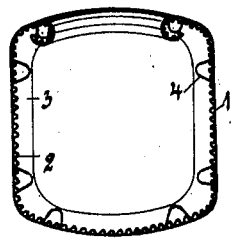

Figs. 24 and 25 illustrate a hull of a flying machine, which is likewise nothing but a girder subjected to rending strains. The outer skin 1 of this hull construction is stayed by corrugated sheet metal 2, the corrugations of which are disposed in the longitudinal direction of the hull. Frame members 3 serve to maintain the cross sectional shape of the hull. For the further reinforcement of the sides of the hull between the frame members, there are arranged single hollow longitudinal frame members 4, disposed at considerable distances the one from the other, which are adapted to assist the skin and the corrugated sheet metal in taking up the bending strains.

Figure 26:
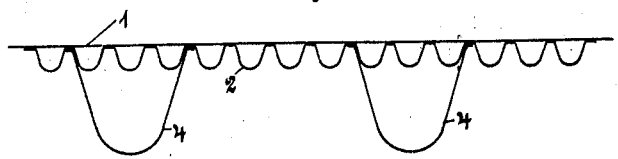
Fig. 26 is an enlarged detail thereof.

Fig. 26 shows the arrangement of the stiffening members on the skin on an enlarged scale.

Which of the aforesaid forms of construction is to be selected will depend inter alia upon the material employed for the skin, which material must of course possess a certain amount of compressional strength. For this purpose there will in this case primarily enter in consideration metal; however, also veneer, press spahn, celluloid-like materials etc., may be made use of. Moreover, the construction selected will depend on the methods of attachment chosen for connecting the individual parts. In the case of metals, the connection may for example be effected by welding, soldering, or riveting. In the case of supporting planes and stiffening means consisting of metal, the electric welding will be found specially suitable. In contradistinction to rivet or folding joints electric welding secures a perfectly smooth outer skin, while relatively to soldering it possesses amongst others the advantage of affording a saving in weight and preserving the absolute strength of the material, features of essential importance in connection with joints subject to tensile strain.

The selection of the manner of reinforcement will further depend on the weight to be taken into account, which for its part again will depend on the type and size of the aeroplane entering into consideration.

The application of my present invention is not restricted to supporting planes and hulls of flying machines, but also other hollow bodies may with advantage be constructed in accordance therewith. This applies amongst others in particular to the floats of hydroplanes which, as is well known, when descending on water, on being subjected to the impact of the waves etc. are subjected to particularly great strains, and which floats shall nevertheless possess the least weight possible, all the more as they generally constitute nothing but a dead load while in the air.

I claim:

1. A flying machine surface comprising in combination a sheet metal skin, a layer of corrugated sheet metal connected with said skin and stiffening members extending transversely to the corrugations of said layer and adapted to maintain the shape of the skin.

2. A flying machine surface comprising in combination a sheet metal skin, a layer of corrugated sheet metal connected with said skin, stiffening members extending transversely to the corrugations of said layer and adapted to maintain the shape of the skin, and reinforcing members extending along the corrugations.

3. A flying machine surface comprising in combination a sheet metal skin, a layer of corrugated sheet metal connected with said skin, stiffening members extending transversely to the corrugations of said layer and adapted to maintain the shape of the skin, and channel-shaped reinforcing members extending along the corrugations and fixed thereto by their free edges.

4. A flying machine surface comprising in combination a sheet metal skin, a layer of corrugated sheet metal connected with said skin and a further layer of corrugated sheet metal, the corrugations of the latter extending transversely to the corrugations of the first mentioned layer.

5. A flying machine surface comprising in combination a sheet metal skin, a layer of corrugated sheet metal connected with said skin and a further layer of corrugated sheet metal, the corrugations of the latter being larger than and extending transversely to the corrugations of the first mentioned layer.

6. A flying machine surface comprising in combination a sheet metal skin and a plurality of layers of corrugated sheet metal fastened together, the corrugations of adjoining layers extending transversely to one another, one of these layers being connected with the skin.

In testimony whereof I affix my signature.

HUGO JUNKERS.